(No Model.)
R. W. EAMES.
OILER FOR RECIPROCATING ENGINES.
No. 453,580. Patented June 2, 1891.
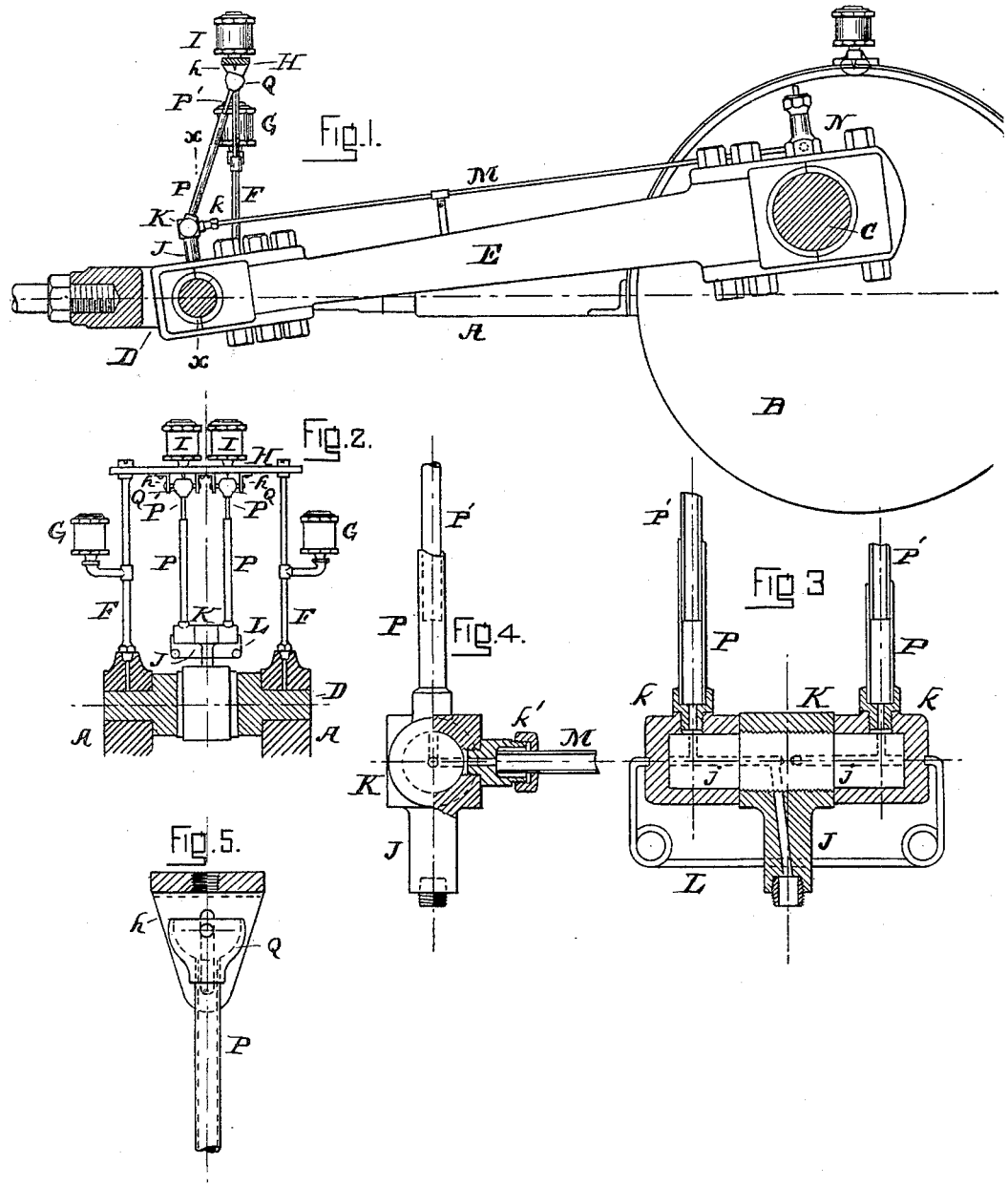
WITNESSES:
Ida M. Memmer
C. E. Humphrey
INVENTOR
Ryland W. Eames
BY
C. P. Humphrey,
ATTORNEY

UNITED STATES PATENT OFFICE.

RYLAND WALTER EAMES, OF DENVER, COLORADO, ASSIGNOR OF ONE-HALF TO CHARLES H. BROWN, OF SAME PLACE.

OILER FOR RECIPROCATING ENGINES.

SPECIFICATION forming part of Letters Patent No. 453,580, dated June 2, 1891.

Application filed June 12, 1889. Serial No. 313,980. (No model.)

*To all whom it may concern:*

Be it known that I, RYLAND WALTER EAMES, a citizen of the United States, residing at Denver, in the county of Arapahoe and State of Colorado, have invented a certain new and useful Oiler for Reciprocating Engines, of which the following is a specification.

My invention has relation to improvement in that class of oilers for the movable journals of reciprocating engines in which the lubricant is conveyed from a stationary oil-cup to the movable journals by means of telescoping conveying-tubes.

The objects of my invention are to produce more complete and perfect devices for conveying the lubricant to the journals and to provide a distributing-joint between the stationary oil-cups and the movable journals, whereby several journals may be simultaneously fed from the same cup.

To the aforesaid objects my invention consists of the peculiar and novel construction, combination, and arrangement of parts hereinafter described, and then specifically pointed out in the claims, reference being had to the accompanying drawings, forming a part of this specification.

In the accompanying drawings, in which similar letters of reference indicate like parts, Figure 1 is a side elevation of a part of a reciprocating engine with my improved device connected with the cross-head and crank-wrist; Fig. 2, a vertical transverse section of the same at the line *x x;* Figs. 3 and 4, enlarged details of the distributing-joint hereinafter more fully described, and Fig. 5 a modification of the rocking drip-cup hereinafter described.

Referring to these drawings, A is a part of the housing of a reciprocating engine, on which are mounted guides for the cross-head D, and in which is journaled in suitable bearings a shaft bearing the disk-wheel B, provided with the wrist-pin C, connected with the cross-head by the connecting-rod E. Mounted on the housing A, and preferably intermediate of the stroke of the cross-head D, are two hollow posts F, which connect with the interior of the guides, and each of which bears an oil-cup G to supply oil to said guides and cross-head. The posts F are united at the top by a bridge H, and therewith constitute a support for two oil-cups I I', which are mounted on said bridge and are provided with dripping-tubes through which the lubricant gradually escapes into oscillating receivers Q, hereinafter described.

Preferably inserted in the strap of the connecting-rod E, at the cross-head, is a short tube J, which supports a joint K, through which the lubricant is conveyed to the different journals.

The joint K, which for the purpose of this specification, is called the "distributing-joint," may be of any desired form, as a "ball" or "universal" joint, but is preferably made as shown in Figs. 3 and 4, in which the tube J terminates in a transverse tube, constituting, substantially, a T-union, in the transverse part of which is a short shaft *j*, provided with central longitudinal oil-passages extending inward from each end and radial oil-passages uniting therewith from the outer and inner ends and connected as hereinafter described. Caps *k k* fit on the ends of the shaft *j*, where they are held by a spring L and serve to close the longitudinal oil-passages and constitute a part of the distributing-valve. The inner radial oil-passages register, respectively, with the tube J and a pipe M, fitted with a stuffing-box *k'* and connected with the oil-cup N in the strap of the connecting-rod E. The outer radial ports register with openings in the caps *k*, in which are inserted pipes P. Inside the pipes are fitted and arranged to slide smaller pipes P', each bearing at its upper end a cup Q, pivotally supported below the oil-cups I by screws or analogous devices, which enter brackets *h*, attached to the bridge H. By this arrangement the lubricant flowing from the cups I falls into the cups Q, and thence passes to the distributing-joint and from that through the tubes J and M to the journals to be lubricated.

Instead of the telescoping tubes P P', the tube P may connect directly with the cup Q, and the pivotal screws of the latter rest in vertical slots in the brackets *h*, as shown in Fig. 5, thereby permitting the same extension and retraction due to the stroke of the engine as in the other construction, the one being regarded as an equivalent of the other.

Having thus described my invention, I claim—

1. The combination, with a fixed oil-cup, of a distributing-joint connected with said oil-cup by an extensible tube, said distributing-joint being provided with two or more tubes to convey the lubricant simultaneously to different journals, substantially as shown and described.

2. In an oiler for reciprocating engines, the herein-described distributing-joint, consisting of the pipe J, having a chamber to receive the shaft $j$, and a side opening for the pipe M, the shaft $j$, having radial and longitudinal oil-passages, caps $k$, and spring L, said radial passages communicating with the pipe M and oil-passage in the pipe J, all constructed and arranged substantially as shown.

In testimony that I claim the above I hereunto set my hand.

RYLAND WALTER EAMES.

In presence of—
H. H. BROWN,
J. H. NICHOLS.